(12) United States Patent
Brown et al.

(10) Patent No.: US 7,926,765 B1
(45) Date of Patent: Apr. 19, 2011

(54) PIPE LOCATOR AND SUPPORT

(75) Inventors: Larry Brown, San Diego, CA (US); Virgil E. O'Neil, Vista, CA (US); John R. Thomas, Vista, CA (US); Jeffrey A. Jaramillo, Poway, CA (US)

(73) Assignee: Securus, Inc., San Marcos, CA (US)

( * ) Notice: Subject to any disclaimer, the term of this patent is extended or adjusted under 35 U.S.C. 154(b) by 123 days.

(21) Appl. No.: 12/008,854

(22) Filed: Jan. 15, 2008

Related U.S. Application Data

(60) Provisional application No. 60/880,879, filed on Jan. 17, 2007.

(51) Int. Cl.
*F16L 5/00* (2006.01)

(52) U.S. Cl. .............. 248/57; 4/695; 248/68.1

(58) Field of Classification Search .......... 248/57, 248/68.1, 49, 73, 56, 65; 4/695; 138/106, 138/107, 112; 72/404
See application file for complete search history.

(56) References Cited

U.S. PATENT DOCUMENTS

| | | |
|---|---|---|
| 0,885,924 A | 3/1913 | Mallery |
| 2,128,040 A | 8/1938 | Conners |
| 2,157,918 A | 5/1939 | Rankin |
| 2,295,888 A | 9/1942 | Bucknell et al. |
| 2,362,124 A | 11/1944 | Ellinwood |
| 2,387,951 A | 10/1945 | Slater et al. |
| 2,404,531 A | 7/1946 | Robertson |
| 2,417,260 A | 3/1947 | Morehouse |
| 2,463,407 A | 3/1949 | Melton |
| 2,489,119 A | 11/1949 | Burns, Jr. et al. |
| 2,611,658 A | 9/1952 | McGuire |
| 2,628,799 A | 2/1953 | Aaby |
| 2,661,483 A | 12/1953 | Tortorice |
| 2,773,708 A | 12/1956 | Beyerle |
| 2,813,568 A | 11/1957 | Kilmarx, Jr. |
| 2,824,312 A | 2/1958 | Tortorice |
| 2,843,363 A | 7/1958 | Mailander |
| 2,897,533 A | 8/1959 | Bull et al. |
| 2,956,468 A | 10/1960 | Macy |
| 2,997,058 A | 8/1961 | Hall |
| 3,021,103 A | 2/1962 | Beyerle |
| 3,030,130 A | 4/1962 | Appleton |
| 3,033,624 A | 5/1962 | Biesecker |
| 3,078,551 A | 2/1963 | Patriarca et al. |
| 3,097,843 A | 7/1963 | Morrow |
| 3,243,206 A | 3/1966 | Samer |
| 3,266,025 A | 8/1966 | Roll |
| 3,272,542 A | 9/1966 | Haulik et al. |
| 3,366,356 A | 1/1968 | Fisher |
| 3,404,858 A | 10/1968 | Levy |
| 3,424,856 A | 1/1969 | Coldren |
| 3,434,746 A | 3/1969 | Watts |

(Continued)

*Primary Examiner* — Ramon O Ramirez

(74) *Attorney, Agent, or Firm* — Stetina Brunda Garred & Brucker

(57) ABSTRACT

An plumbing pipe locator and support is provided for fixing plumbing pipes in position relative to studs in a building. The pipe locator and support comprises an elongated supporting strap having upper and lower sides extending along opposing sides of a longitudinal axis. A first plurality of longitudinally aligned, larger pipe openings are interspersed with a second plurality of smaller, aligned fastener openings that extend into ends of the strap. The upper and lower sides undulate to provide a substantially uniform width between first holes and the adjacent sides and the second holes and the adjacent sides. This undulating surface can provide a strap using less material, with reduced manufacturing time, and a strap that can bend without forming creases or stress fractures.

36 Claims, 5 Drawing Sheets

U.S. PATENT DOCUMENTS

| | | |
|---|---|---|
| 3,438,686 A | 4/1969 | Stone |
| 3,552,754 A | 1/1971 | Bow |
| 3,559,730 A | 2/1971 | Benjean |
| 3,562,847 A | 2/1971 | Jemison |
| 3,572,770 A | 3/1971 | Kagi |
| 3,690,609 A | 9/1972 | Montesdioca |
| 3,718,307 A | 2/1973 | Albanese |
| 3,788,582 A | 1/1974 | Swanquist |
| 3,788,655 A | 1/1974 | Hathaway |
| 3,829,184 A | 8/1974 | Chevret |
| 3,844,588 A | 10/1974 | Jocsak |
| 3,944,175 A | 3/1976 | Kearney |
| 4,156,103 A | 5/1979 | Dola et al. |
| 4,192,477 A | 3/1980 | Decky |
| 4,272,006 A | 6/1981 | Kao |
| 4,299,363 A | 11/1981 | Datschefski |
| 4,550,451 A | 11/1985 | Hubbard |
| 4,907,766 A * | 3/1990 | Rinderer .................. 248/57 |
| 4,909,461 A * | 3/1990 | Collins .................. 248/68.1 |
| 5,050,824 A * | 9/1991 | Hubbard .................. 248/57 |
| 6,012,685 A * | 1/2000 | Saraceno, Jr. ............ 248/68.1 |
| 6,158,066 A * | 12/2000 | Brown et al. .................. 4/695 |
| 6,467,764 B1 * | 10/2002 | Stevens .................. 271/4.01 |
| 6,796,335 B1 * | 9/2004 | Hubbard et al. .......... 138/106 |
| 7,014,152 B2 * | 3/2006 | Grendahl .................. 248/49 |
| 7,039,965 B1 * | 5/2006 | Ismert .................. 4/695 |
| 7,527,225 B1 * | 5/2009 | Schulz et al. .............. 248/65 |

* cited by examiner

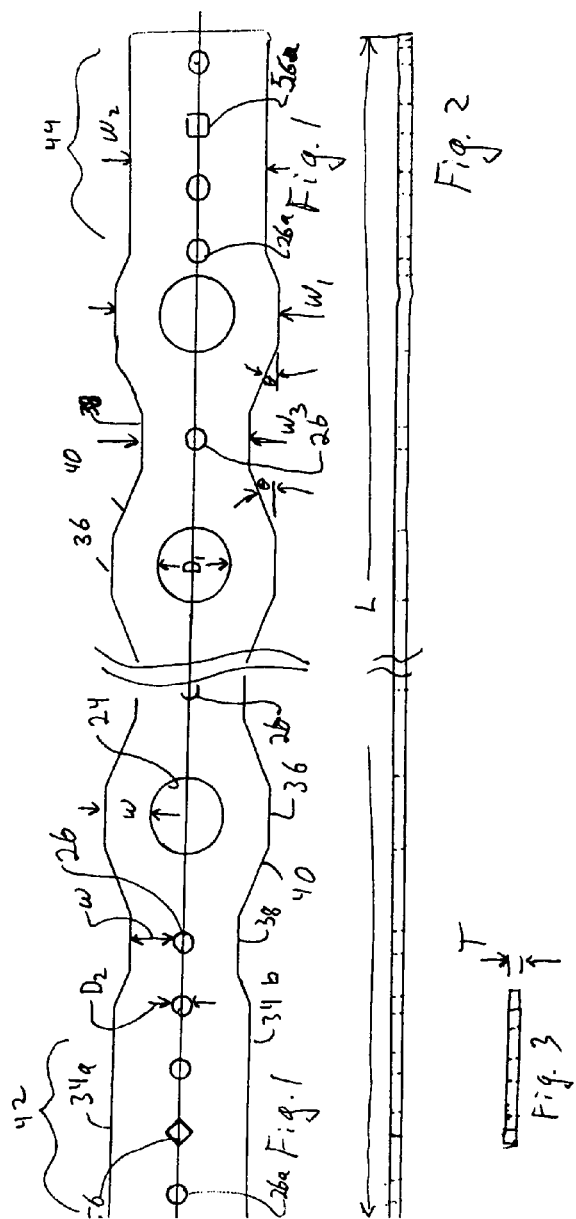
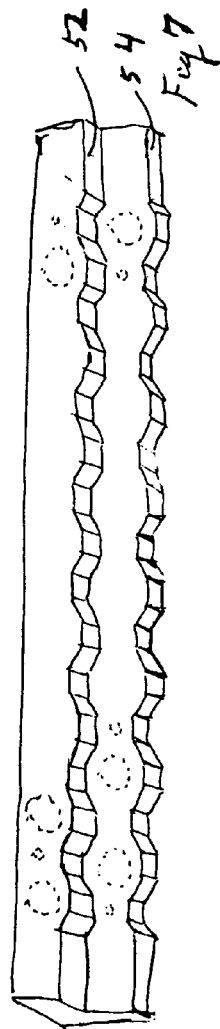

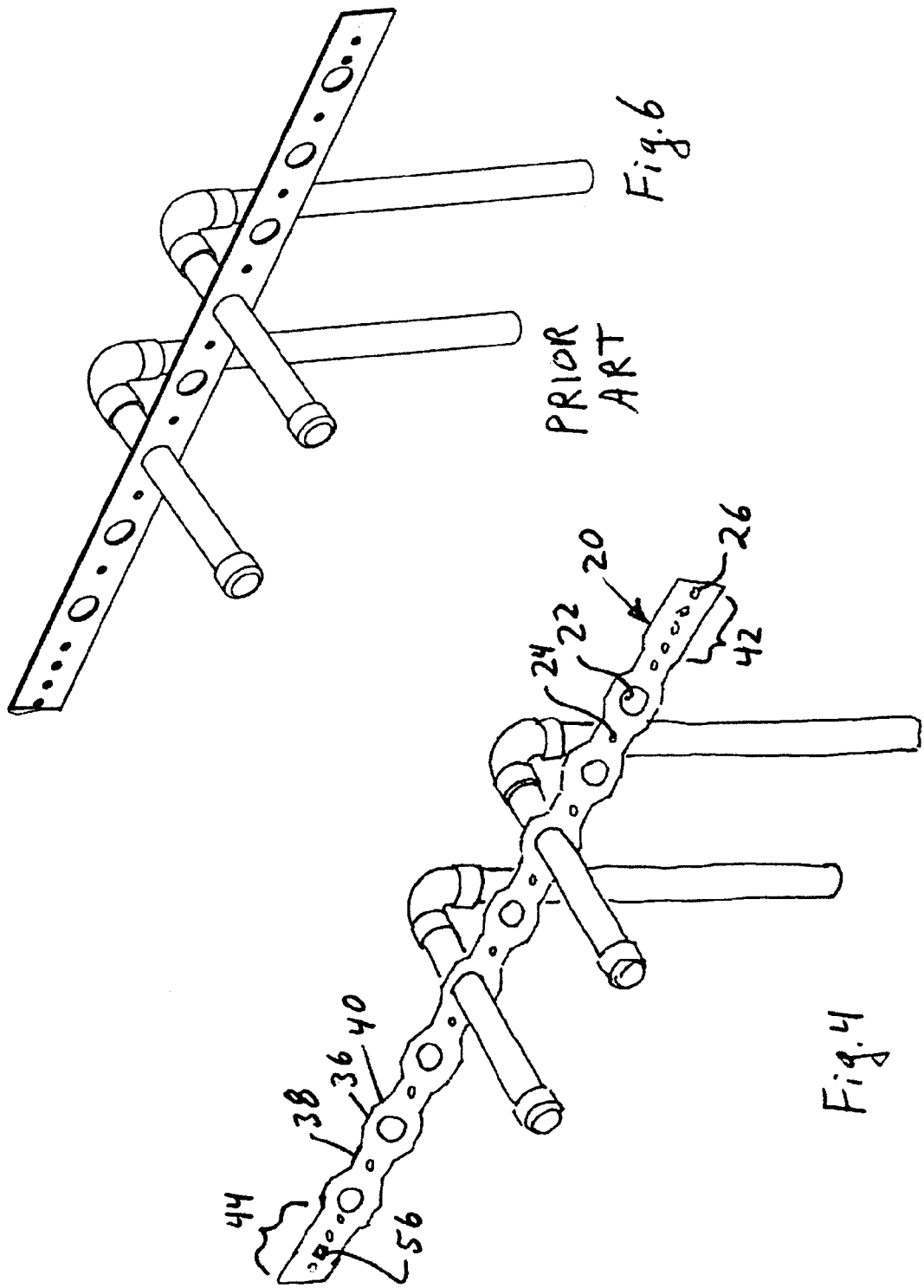

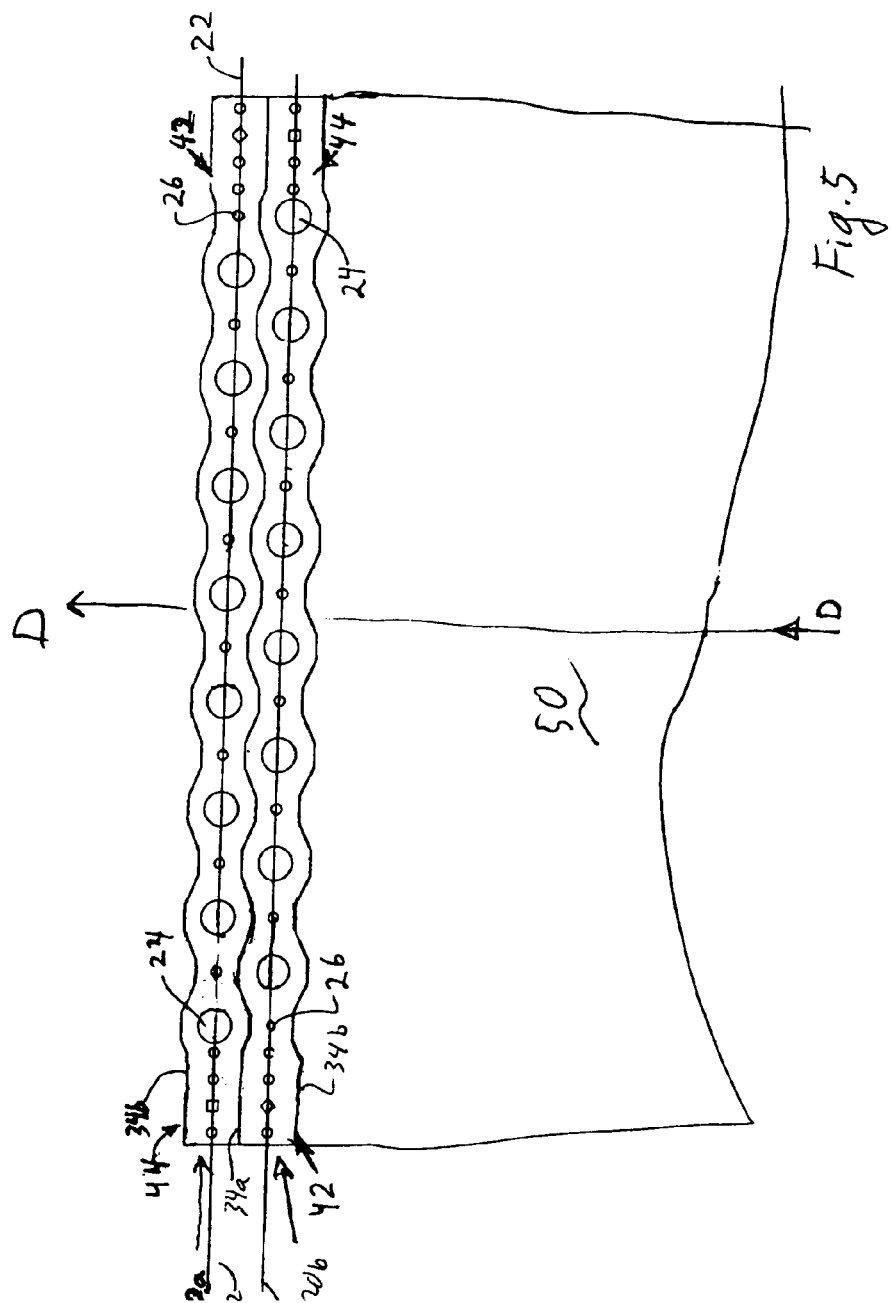

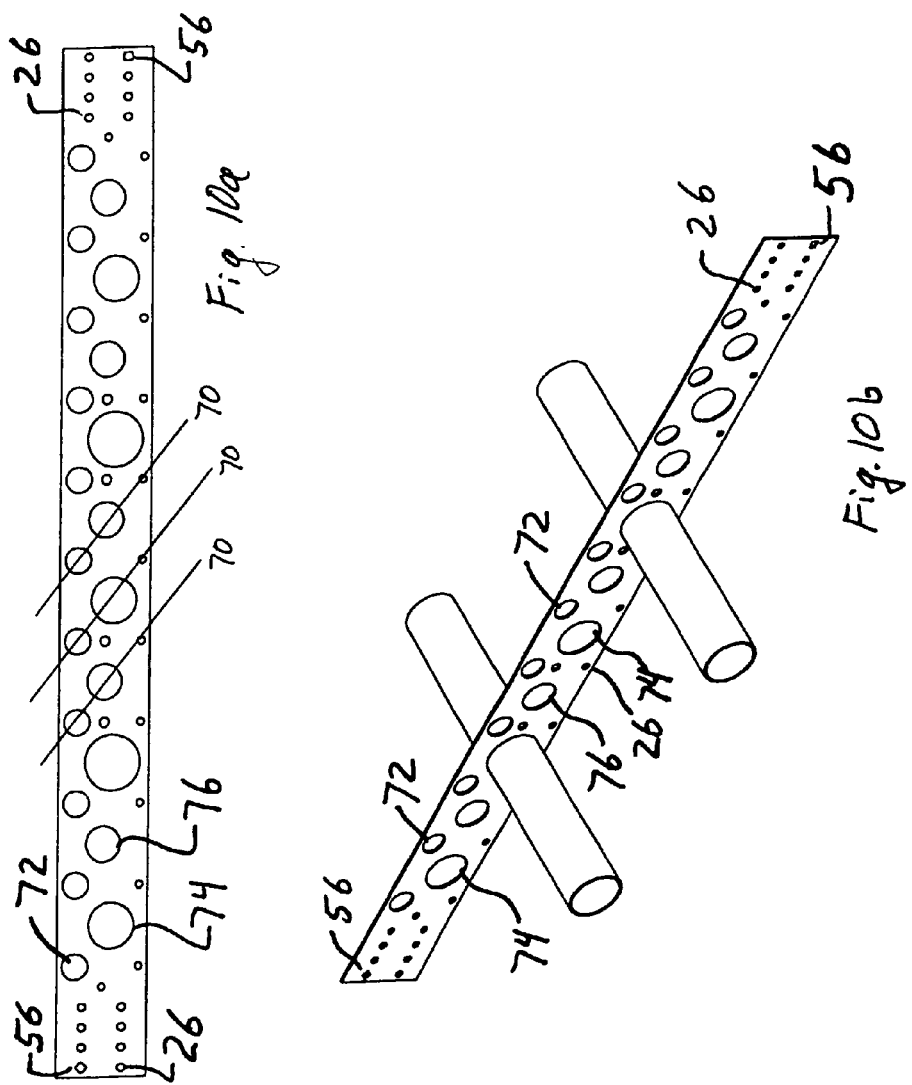

PIPE LOCATOR AND SUPPORT

CROSS-REFERENCE TO RELATED APPLICATIONS

The application claims the benefit under 35 U.S.C. §119 (e), of application Ser. No. 60/880,879, filed Jan. 17, 2007, the entire contents of which are incorporated herein by reference.

STATEMENT RE: FEDERALLY SPONSORED RESEARCH/DEVELOPMENT

Not Applicable

BACKGROUND

Pipes that are adapted to mate with a plumbing fixture such as a sink or the like typically extend upwardly between building studs, and then project outwardly for connection to the plumbing fixture. The pipes must be securely fixed in place to prevent vertical, lateral and axial movements under the stress of use. The pipes must also be located a predetermined distance apart to precisely align them with the fixture inlets. One prior art means for securing pipes between studs uses a strap with spaced holes of alternating large and small sizes, as described in U.S. Pat. No. 4,550,451. This plumbing strap worked well, but it uses a long strip of material so the strap can extend between studs typically spaced from 16-24 inches. Further, the uniform width of the strap is set by the largest hole in the strap to ensure that there is sufficient material between the edge of the hole and the side of the strap, so that the strap is not only long, but wide. There is thus a need for a strap that uses less material.

Further, these straps are typically made by running a narrow coil of metal through dies that punch the holes and advance the metal along the length of the plumbing strap, but it takes time to advance the coil the length of the strap so manufacturing costs and times are increased. There is thus a need for a strap that uses less material and that can be manufactured faster.

BRIEF SUMMARY

The present invention is for a universal plumbing pipe locator and support and a method of making that pipe locator and support. The pipe locator and support comprises a supporting strap which includes a plurality of longitudinally spaced apart openings in the form of holes or slots, spaced apart predetermined distances for receiving and thereby locating a pair of pipes in proper spaced relation for attachment to complemental conduits of a plumbing fixture or the like, such as a faucet. A second plurality of smaller holes can be provided to accept nails, screws or the like to secure the strap to usual building studs. Alternatively, a clamp can be used to attach the strap to a waste pipe or the like. For ease of reference this pipe locator and support will be called a plumbing strap.

The plumbing strap has a variable width, and preferably, but optionally has a constant length and constant thickness. The maximum width is selected to provide a sufficient amount of material across the width of the strap to support the plumbing pipes or conduits during use of the plumbing strap. The spacing between the largest hole and the edge or side of the strap is roughly maintained along the length of the strap so the strap is wider at the larger holes and narrower at the smaller holes to form an undulating edge or side. The ends are preferably formed with parallel opposing sides. The undulating sides are preferably symmetric about a longitudinal axis of the strap, but is not symmetric about an axis through the center of the strap and in the plane of the strap containing the opposing sides. This results in a strap that has roughly equal spacing between the outermost edges of the hole and the adjacent edge of the strap. The resulting strap is more flexible than the prior art straps, uses less material than the prior art straps, and that can be made faster than the prior art straps.

In one preferred embodiment, there is provided a plumbing strap used in combination with a pair of spaced apart building studs for fixing the pipes in position relative to and an associated pair of pipes. An elongated supporting strap is provided having upper and lower sides extending along opposing sides of a longitudinal axis and having a length sufficient to fasten opposing ends of the strap to the studs. The plumbing strap has a first plurality of longitudinally aligned first openings located between the upper and lower sides and extending between the ends of said strap, with the openings being spaced apart by a predetermined distance so the pipes are alignable and in registration with the openings. The elongated plumbing strap is adapted to be dimensioned to a predetermined elongated length with the pipes projecting through a pair of the first openings. The plumbing strap further has a second plurality of openings extending between the ends of the strap and being smaller than the first openings. The upper and lower sides undulate to provide a substantially uniform width between first holes and the adjacent sides and the second holes and the adjacent sides along at least an axis through a center of the holes and perpendicular to the longitudinal axis and passing through both sides. Thus, the sides are wider adjacent the first openings and narrower adjacent the second openings. Fasteners extend through third holes in the ends and fastening said strap to said studs. The third holes can be the same as the second holes.

In further preferred variations, the first plurality of openings in the strap are cylindrical and circumferentially coextensive with the adjacent circumference of said pipe. Moreover, the first and second openings are preferably of two different diameters and alternate along a substantial length of said strap. Further, the sides are preferably mirror images of each other about the longitudinal axis. Moreover, the strap advantageously has ends containing a plurality of said second openings but not the first openings. Finally, and optionally, the strap has at least one shaped opening therein having a square shape sized to engage a shut-off valve of a bottle of combustable gas.

In a further alternative embodiment, a pipe locator and support is provided for extending between studs in a building to hold plumbing pipes in position. The pipe locator and support has an elongated strap with a longitudinal axis and opposing sides. The strap further has a first plurality of holes and a second plurality of holes alternating with the first plurality between first and second ends. The second plurality of holes is smaller than the first plurality and the sides undulate to provide a larger width at the first holes and a narrower width at the second holes.

In further optional variations on this alternative embodiment, the first plurality of holes are equally spaced apart and the second plurality of holes is equally spaced apart with the first and second holes centered on the longitudinal axis. Moreover, the ends advantageously each have at least one hole sized to allow a shaft of a fastener to extend therethrough during use, while preventing an enlarged head of the fastener from passing therethrough during use of the strap. In a further variation, the pipe locator and support comprises a flat strap having a width axis perpendicular to the longitudinal axis and in the plane of the strap, with the undulating sides providing a substantially uniform width between the first and second holes and the adjacent sides at the largest dimension of the holes when measured along the width direction through a center of the holes. In a further variation, the first end is preferably adjacent a first hole and the second end is adjacent a second hole. Preferably, the sides are mirror images of each other about the longitudinal axis.

Moreover, in further variations the holes are preferably circular and the sides have a first largest width formed by first flats on opposing sides of the first holes and parallel to the longitudinal axis, the sides having a second width smaller than the first width and formed by second flats on opposing sides of the second holes with inclines joining the first and second flats and with the flats being parallel to the longitudinal axis. Additional variations have the first and second ends including sides with a third width that is smaller than the first width and larger than the second width. The inclines are preferably formed at an angle of about 58° relative to the longitudinal axis. Moreover, the ends may contain shaped holes sized to engage a gas-shut-off. Still more preferably, the holes are circular with a width w between the first holes and the adjacent first flats measured along the width axis through the center of the first holes being about the same as the width w between the second holes and the adjacent second flats measured along the width axis through the center of the second holes.

In a still further embodiment a plumbing strap is provided with a length sufficient to fastening plumbing pipes between studs of a building. The plumbing strap includes a flat strip of metal having a longitudinal axis and a width axis perpendicular to the longitudinal axis and a thickness. The plumbing strap has ends with parallel sides and a middle portion with undulating sides undulating between a larger first width and a smaller second width, the strap having a first series of holes extending through the thickness and along the length of the middle portion and located at the first undulations with a second series of smaller holes extending through the thickness and located in the second undulations. Each end has a plurality of spaced-apart third holes extending through the thickness.

In further variations of this further embodiment, the first holes are spaced the same distance apart and the second holes are spaced the same distance from each other. Moreover, the middle portion can have a first hole adjacent the first end and a second hole adjacent the second end. Additionally, the middle portion can include an undulation having the first width adjacent the first end and an undulation having the second width adjacent the second end. Further, the second width can contains a second hole that is spaced apart from the center of the adjacent third hole a distance that is the same as the spacing between the centers of the third holes. Moreover, the ends can have a third width that is smaller than the first width and larger than the second width. Further, the undulations are preferably formed by straight segments some of which are parallel to the longitudinal axis. Additionally, the third holes can be square and sized to engage a gas-shutoff valve. Further, one of the third holes in each end can be square shaped and sized to engage a gas-shutoff valve, with the shaped holes rotated 45° in the plane of the strap relative to each other. Preferably, the first holes are circular with a width w between the first holes and the adjacent undulating side measured along the width axis through the center of the first holes, and about the same as the width w between the second holes and the adjacent undulating side measured along the width axis through the center of the second holes. In the preferred commercial embodiment, the ends have a width of about 1 inch.

There is also provided a method of making a plumbing strap from an elongated strip of metal having a width corresponding to a length of the strap as measured along a longitudinal axis of the strap. The method includes configuring punch dies to form opposing sides of at least one plumbing strap where the strap has opposing first and second ends with a middle portion. The middle portion has undulating first and second opposing sides which are substantially mirror images of each other about the longitudinal axis, with a first undulation width larger than a second undulation width and the ends having a common width that is between the first and second undulation widths. The middle portion begins with one of a first or second undulation width adjacent the first end and ending with the other of a first or second undulation width adjacent the second end. The undulations being regularly spaced along the longitudinal axis.

The method also includes orienting the punch dies and the strip of metal so the longitudinal axis of the strap extends across the width of the strip of metal. Finally, the method includes repeatedly moving the dies to punch opposing sides of at least one strap successively from the strip of metal as the strip of metal advances past the dies a distance corresponding to a multiple of the width of an end of the strap that is at least twice the width of an end of the strap.

In further variations, the method includes punching a first large hole centered in each of the first widths and along the longitudinal axis and punching a second smaller hole centered in each of the second widths and along the longitudinal axis. The holes are preferably round and may be punched before the dies are moved, after the dies are moved, or punched as the dies are moved.

The method can also include punching a plurality of third small holes in each end, preferably with the third small holes being located along the longitudinal axis. Another variation includes punching a plurality of third small holes in each end, with the third small holes being located along the longitudinal axis. The third holes can be punched the dies are moved, punched after the dies are moved, or punched as the dies are moved. Moreover, the method can include configuring the die to punch opposing sides of more than one strap, with the metal advancing past the dies a distance corresponding to 1+(the number of sides being cut)/2.

In another embodiment, a plumbing strap is provided having a plurality of alternating large and small holes with the large holes sized to receive plumbing pipes and the small holes sized to receive a fastener to fasten the strap to a stud during use. The strap in this embodiment also has a length sufficient to extend between adjacent studs of a building during use, and further has square openings in opposing ends of the strap with the square openings sized to engage a shut-off valve of a bottle of combustable gas.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a top plan view of a pipe locator and support;

FIG. 2 is a side plan view of the pipe locator and support of FIG. 1, with the opposing side view being a mirror image thereof;

FIG. 3 is an end plan view of the pipe locator and support of FIG. 1; with the opposing end view being a mirror image thereof;

FIG. 4 is a perspective view of the pipe locator and support of FIG. 1 in use;

FIG. 5 is a top plan view of a sheet of metal showing the manufacture of the pipe locator and support of FIG. 1;

FIG. 6 is a perspective view of a prior art plumbing strap in use;

FIG. 7 is a perspective view of a punch die used to form the sides of the plumbing strap of FIG. 1;

FIG. 10a is a plan view of a plumbing strap with multiple sized pipe holes and with shaped wrenching holes in the strap.

FIG. 10b is a perspective view of a plumbing strap with multiple sized pipe holes and with shaped wrenching holes in the strap.

DETAILED DESCRIPTION

Figure 9:
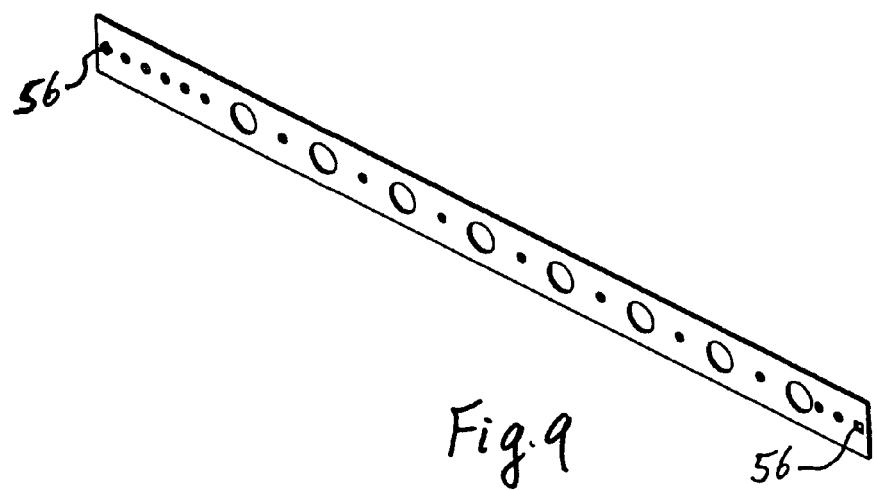
FIG. 9 is a perspective view of a plumbing strap with shaped wrenching holes in it.

Referring to FIGS. 1-4, a pipe locator and support 20 (hereinafter a "plumbing strap") is provided comprising an elongated member having various widths W, a thickness T, and a length L measured along a longitudinal axis 22. The plumbing strap 20 has a first plurality of holes 24 having a first diameter. A second plurality of smaller holes 26 alternates with the first plurality of holes 24, and both are advantageously centered on the same axis, preferably the longitudinal axis 22. There are thus a series of alternating holes having different sizes. The holes 24, 26 are preferably circular with larger and smaller diameters $D_1$ and $D_2$, respectively. The larger diameter holes 24 have a size selected sized to receive the plumbing pipes 28 (FIG. 4) and the smaller holes 26 are sized to receive fasteners 30 such as nails, screws, wire, etc. to fasten the plumbing strap 20 to studs 32 of a building (FIG. 6). The ends of the plumbing strap 20 preferably, but optionally, have a series of small holes 26 with no intermittent large holes 24, so the plumbing strap can be positioned laterally and still have the small fastener holes 26 overlap a stud 32 at each end of the strap.

Referring to FIGS. 1 and 4, the plumbing strap 20 has undulating sides 34a, 34b forming a variable width strap 20 such that the major length of the strap has a generally uniform width "w" of material extending between the edge of the holes 24, 26 and the adjacent side 34a, 34b of the plumbing strap, at least along an axis through the center of the holes 24, 26 and in the plane containing the sides 34a, 34b and perpendicular to the longitudinal axis 22. The width "w" is substantially uniform in that it varies by about 20% or less along the width axis passing through the center of the holes 24, 26 in the plane of the strap and perpendicular to the longitudinal axis, and preferably varies by about 10% or less.

Because the middle portion of the plumbing strap 20 between ends 42, 44 has alternating large and small holes, the middle portion of the strap has edges or sides that undulate from larger to smaller. The undulating sides 34a, 34b are preferably, but optionally, formed by straight segments comprising opposing flat tops 36 adjacent the larger holes 24 and flat bottoms 38 adjacent the smaller holes 26, joined by inclines 40. The undulating sides 34a, 34b are mirror images of each other about the longitudinal axis 22. The angle θ (theta) of the inclines 40 is about 58° from the horizontal, so that the width "w" between each hole 24, 26 to the adjacent edge 34a, 34b, is about the same, at least along the width axis through the center of the holes 24, 26 as discussed in the above paragraph.

The largest width of the plumbing strap 20 has a width $W_1$ comprising the diameter $D_1$ of the larger hole 24 with the width "w" on each side, so the width $W_1=D_1+2w$, where $W_1$ is the width of the strap between opposing outer flats 36.

The two opposing ends 42, 44 of the plumbing strap have a width $W_2$ that is slightly greater than the width or diameter $D_2$ of the smaller holes 26 plus twice the generally uniform width "w" such that $W_2$ is slightly greater than $D_2+2w$. The width of the ends 42, 44 is intermediate the width of the plumbing strap 20 at the larger first holes 24 and the smaller second holes 26. As seen in FIG. 1, the left end 42 is adjacent the small width containing smaller hole 26, so the end 42 is has a width that is larger than the adjacent section of the plumbing strap 20. The right end 44 is smaller than the adjacent section of the plumbing strap that contains the larger hole 22. Thus, adjacent the one end 42, the plumbing strap 20 necks down, while at the opposite end 44 the plumbing strap expands or necks outward.

The narrowest width $W_3$ of the plumbing strap 20 is preferably at the location of the smaller fastener holes 26 intermediate the larger holes 24, with the width $W_3$ about twice the generally uniform width "w" plus the diameter of the smaller holes 26, so that $W_3=D_2+2w$, where $W_3$ is the width between opposing inner flats 38. These width calculations are not exact and are instead general approximations, as will become apparent later when the manufacturing method is explained, and some variation in the widths can occur while still achieving the advantages of this invention and accommodating various sized holes.

The undulating sides 34a, 34b of the plumbing strap 20 comprise a series of inner flats 38 on opposing sides of a smaller hole 26 alternating with a series of outer flats 36 on opposing sides of a larger hole 24, where the distance from the edges of the holes 24, 26 to the adjacent sides formed by the outer or inner flats 36, 38 is about the width "w." The larger holes 24 are preferably about 0.5 inches in diameter or slightly larger to accept 0.5 inch plumbing pipes, but the size can vary. The holes 24 are preferably, but optionally spaced about 2 inches apart, center-to-center. The smaller holes 26 are preferably about 3/16 inches in diameter and are also spaced about 2 inches apart, center-to-center, alternating with the larger holes 24.

The plumbing strap 20 is typically about 16 inches or 24 inches long so it can extend between studs typically spaced about 16 inches apart in residential buildings, and about 24 inches apart in commercial buildings or on non-load bearing walls. The strap may be slightly longer to accommodate errors in stud spacing. The four smaller holes 26 on the ends 42, 44 are preferably spaced about 0.5 inches apart, center-to-center, and may be considered as a third set of holes 26a even though they are preferably, but optionally, the same size and shape as the second set of holes 26. The ends 42, 44 can vary in length, as can the number and arrangement of holes 26 in the ends, but the ends are preferably long enough to accommodate errors in stud spacing so a fastener (e.g., nail, screw, etc.) can pass through a hole 26 in the end to fasten the strap to the stud.

The plumbing straps are preferably not symmetric as the left end 42 as seen in FIG. 1 has four small holes 26 adjacent a narrow segment with inner flats 38 on opposite sides of a small hole 26. The opposing end 44 on the right as seen in FIG. 1 has four small holes 26 adjacent a larger segment with outer flats 36 on opposing sides of a large hole 24.

The width $W_2$ of the strap on ends 42, 44 has a width that is intermediate the widths $W_1$ and $W_3$. Thus, on the ends 42, 44 the width between the edge of the holes 26 and the adjacent side 34a, 34b of the plumbing strap 20 is slightly larger than the width "w."

As seen in FIG. 6, the prior art plumbing straps had parallel sides, and the commercial embodiment had a width of about 1.25 inches when the larger holes were about 0.5 inches in diameter with about 2 inch center to center spacing and the intervening smaller holes were about 5/16 inches in diameter. That leaves a width of about 3/8 inch between each of the large holes and the adjacent side of the prior art plumbing strap, and a much larger width between the small holes and the sides of the prior art plumbing strap.

In comparison with the prior art strap, the plumbing strap 20 has ends with a width of about 1 inch (not 1.25 in.), about 20% smaller and representing about 20% less material, while still allowing a width "w" of about 3/8 inch between each of the larger holes 24 and the adjacent sides 34a, 34b of the plumbing strap 20. This reduction in material is achieved by the undulating sides 34, which also allows an improvement in the manufacture speed.

Figure 8:
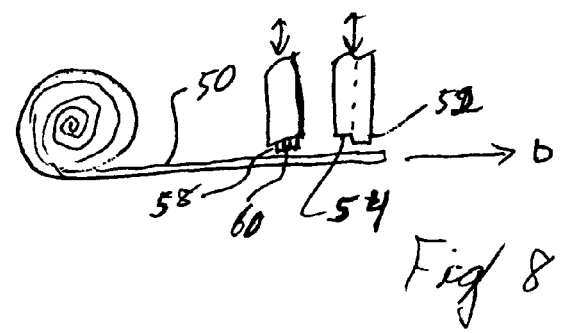
FIG. 8 is a side schematic view of a manufacturing sequence for producing the pipe locator and support of FIG. 1.

Referring to FIG. 8, the plumbing straps 20 are made by advancing a sheet of wide, flat material 50, preferably metal such as brass, copper, tin, aluminum or other sheet metal through a punch press along an axis D along the width of the plumbing straps 20 and perpendicular to longitudinal axis 22. The sheet of material 50 is preferably a coil of metal about 19-20 inches wide where the resulting plumbing strap is for use with 16 inch stud spacing. The first and second series of larger and smaller holes 24, 26 can be punched before or after the sides 34a, 34b are cut, or less preferably, the holes and sides can be formed simultaneously. FIG. 8 illustrates a separate operation to form these holes using a punch having a die or punch 58 to punch the large holes 22 and a separate punch 60 for the smaller holes 26 before forming the sides 34a, 34b and a later punch 54 to form side 34b and a punch 52 to form side 34a. This figure shows all holes 24, 26 being punched simultaneously, but either of the larger or smaller holes 24, 26 could be punched first. Further, the rods forming portions of the dies 58, 60 could extend through dies 52, 54 so all holes and sides could be formed simultaneously.

The plumbing straps 20 are preferably, but optionally, formed in pairs, 20a, 20b. Each adjacent plumbing strap 20 is oriented 180° oppose the adjacent strap, rotated in the plane of the sheet of material 50. Thus, every other plumbing strap 20 has its end 34a on the left side of the sheet of material 50 as shown in FIG. 5, with the intervening straps having the end 34a along the right side as shown in FIG. 5.

Thus, along the left and right sides of the sheet of material 50 as seen in FIG. 5, the part of the inward plumbing strap 20b containing the most distal large hole 24 adjacent end 34b nests with the part of the adjacent, outward or distal plumbing strap 20a containing the most distal small hole 26. Alternatively stated, along either side of the material 50, the hole closes to the edge of the material 50, alternates between large hole 24 and small hole 26.

Reversing the orientation of very other plumbing strap 20, and using a strap that is not symmetric about the axis D allows the undulating sides 34a, 34b to be formed. Referring to FIGS. 7-8, preferably two cutting blades or punches are used, a first blade or punch 52 to form one side 34a simultaneously, and a second blade or punch 54 to form side 34b. The blades or punches can be formed on separate members, or formed on the same member and offset (stepped) in a direction perpendicular to the sheet of material 50 along which direction the sheet of material 50 is cut or sheared. A 150 ton punch press is believed suitable to simultaneously cut sides 34a, 34b to form two straps 20 with a length of about 19.5 inches and a thickness of about 0.060 inches (60 gage metal) for use with studs that are spaced 16-18 inches apart.

During manufacture, the dies or punches 52, 54 and sheet of material 50 are arranged so the length of the strap 20 extends across the width of the sheet of material 50. The undulating sides 34a of the die 52, 54 comprise an interior side on the advancing sheet of material 50 with side 34b forming a distal side located further in the direction D in which the sheet of material is advancing. The sheet of material 50 is advanced a distance equal to one plus (the number of sides being cut divided by two). For a die or punch containing one set of opposing sides 34a and 34b (2 sides being cut), the elongated sheet of material 50 advances a distance of (1+2/2=2) twice the width of end 42 or 44. Thus, the interior die cutting side 34b forms a distal end on the sheet of material 50 that, after the punch or cut is completed, advances past the distal die forming side 34a. Cutting side 34a releases the distal plumbing strap 20a and also releases interior strap 20b.

If four cutting or punching edges (two edges 52 and two edges 54) are provided, the sheet of material 50 would advance 1+4/2=3 times the width of end 42 or end 44. Thus, for each pair of cutting blades or punching edges 52, 54, one additional strap 20 is formed, and the sheet of material is advanced one additional width of the end piece 42 or 44. The sides 34 and holes 24, 26 could be formed by other means, including plasma cutting, laser cutting, high pressure liquid cutting, and other means now known or developed in the future, in which event the distance the sheet of material is advanced will vary.

The reversal and nesting of the undulating sides 34a, 34b for a non-symmetric (about axis D) plumbing strap 20 allows a smaller width on the strap 20, which allows a faster feed of the straps through the punch or cutting press, and which reduces the material used on each strap. By reversing the orientation of the plumbing straps 20 on the sheet of material 50, and by having the straps non-symmetric when folded about a midpoint on the longitudinal axis 22, the undulating sides 34a, 34b can be formed in a more efficient manner, and faster.

The undulating sides 34a, 34b forming the fairly constant width "w" between the holes 24, 26 and the adjacent sides 34a, 34b, also provides a more flexible plumbing strap when the straps are grabbed at the ends and bent about axis D. When prior art plumbing straps with straight and parallel sides are flexed or bent, the straps form crease lines or stress concentration lines along which the material fractures. The crease lines typically extend through one of the larger holes, and this is believed due to the large difference at the location of the large and small holes. The stiffness at the location of the small holes is several times larger than the stiffness at the location of the large holes, so the straps bend at the weakest point which is located at a large hole between the locations where the strap is gripped to bend it. In the plumbing strap 20, the width "w" at the large and small holes 24, 26 is about the same, so the strap bends more uniformly, lacks the stress concentrations of the prior art, and does not kink or form crease lines as with the prior art straps. The undulating sides 34 provide a more uniform amount of material between the holes and the sides, and thus provide means for reducing stress concentrations and crease lines.

The holes 24, 26 are preferably circular, but could have other shapes. The holes 24, 26 can be various sizes to accommodate various sized pipes through the holes. The holes may be larger than the pipes to accommodate collars affixed to the holes or the strap, through which the pipes pass. Such collars are described in U.S. Pat. No. 4,550,451, the complete contents of which are incorporated herein by reference.

The small holes 26 are advantageously sized to allow passage of the diameter of the shaft of the fastener 30 (e.g., nail or screw) passing through the holes while restricting passage of the enlarged head of the fastener. But other shapes could be used for these holes as well.

Referring to FIGS. 1 and 5, the small holes 26 preferably include one or more shaped holes 56. In the illustrated plumbing straps 20 the shaped holes 56 are square with one shaped hole formed in each end 42, 44. Preferably, but optionally, one shaped hole 56 has opposing sides generally parallel to longitudinal axis 22, while the other shaped hole 56 has its corners aligned with that axis (i.e., rotated 45° from the first hole). The shaped holes 56 are preferably sized and shaped to engage a gas shut-off valve on a bottle of MAPP gas commonly used by plumbers to solder pipes. A square about 0.2 inch on a side is believed suitable. Thus, the plumbing strap 20 can be used as a wrench. By rotating one shaped hole 56 relative to the other hole, one of the shaped holes may be easier to engage a shut-off valve. The shaped holes 56 are not limited to use with the improved plumbing strap 20, and may be added to preexisting art plumbing straps or used with straps having parallel sides with a constant width and various combinations of holes therein.

FIG. 9 shows a plumbing strap 20 with alternating large and small holes to accommodate pipes in the larger holes and fasteners in the smaller holes. This hole pattern is in the prior art. But the strap 20 has shaped holes 56 in the ends of the strap which are not believed to be in the prior art. The shaped wrenching holes 56 are preferably, but optionally, the most distal or last holes in the strap. The prior art included straps with more than one sized pipe hole in the strap. FIGS. 10a, 10b show a further plumbing strap 20 having three different sizes of pipe holes, located on diagonal centers along diagonal lines. Straps with different sized holes and with fastener holes are in the prior art, but such straps with the shaped openings 56 are not believed to be in the prior art. In FIGS. 10a-10b, the holes alternate on the diagonals with a first diagonal 70 having a small pipe hole 72, a large pipe hole 74 and optionally a fastener hole 26, and the adjacent diagonal having a small pipe hole 72, a medium pipe hole 76 and an optional fastener hole 26. Fastener holes 26 are optionally placed along the centerline of the plumbing strap. Further, to accommodate the different sized holes the plumbing strap 26 is wider, and two rows of fastener holes 26 are provided. The shaped wrenching holes 56 are preferably located closest to the ends of the strap. The shaped openings 56 are thus adjacent the end of the strap—within the last few fastener holes 26 and preferably the last hole 26 before the end. The shaped openings 56 can be on the same row or on diagonally opposite rows. Each shaped opening 56 is advantageously aligned about a different axis, and are preferably orientated 45° relative to each other. Thus, the opening 56 in the right end of FIG. 56 has its sides parallel to the sides and ends of the rectangular plumbing strap while the opening 56 in the left end has a corner pointing toward each of the sides of the rectangular plumbing strap 20. The above embodiments show a single shaped opening 56 on each end of the strap, but there could be more than one shaped opening 56 on one or both ends. Further, while the shaped opening is preferably on the ends, it could be located anywhere along the length of the strap, and if so is preferably, but optionally adjacent an edge of the strap.

The undulating sides 34a, 34b are described as formed with straight segments. Sides 34 formed with curved segments are also believed suitable, but the dies to form the sides may be more expensive to form.

The above description is given by way of example, and not limitation. Given the above disclosure, one skilled in the art could devise variations that are within the scope and spirit of the invention disclosed herein. For example, the undulating sides are formed with straight segments but could be continuously curved or could have more rounded corners joining the straight segments. The holes 24, 26, 26a are shown a circular, which is preferred, but other shaped holes could be used, especially if collars or inserts are interposed between the holes and the plumbing pipes inserted through the holes. In particular, the holes sized for fasteners (e.g., holes 24, 26) could be elongated to allow variation in placement of the fasteners extending through the holes. Further, the ends 42, 44 could be omitted with the holes 24, 26 extending the entire length of the strap plumbing 20. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. In combination with a pair of spaced apart building studs and an associated pair of pipes, an improved plumbing pipe locator and support for fixing said pipes in position relative to said studs, comprising:

an elongated supporting strap having upper and lower sides extending along opposing sides of a longitudinal axis and having a length sufficient to fasten opposing ends of the strap to said studs, and further having a first plurality of longitudinally aligned first openings located between said upper and lower sides and extending between the ends of said strap, said openings being spaced apart by a predetermined distance wherein said pipes are alignable and in registration therewith, said elongated supporting strap adapted to be dimensioned to a predetermined elongated length, said pipes projecting through a pair of said first openings, said strap further having a second plurality of openings extending between the ends of said strap and being smaller than the first openings, the upper and lower sides undulating to provide a substantially uniform width between first holes and the adjacent sides and the second holes and the adjacent sides along at least an axis through a center of the holes and perpendicular to the longitudinal axis and passing through both sides so the sides are wider adjacent the first openings and narrower adjacent the second openings; and fasteners extending through third holes in the ends and fastening said strap to said studs.

2. The combination of claim 1 wherein said first plurality of openings in said strap are cylindrical and circumferentially coextensive with the adjacent circumference of said pipe.

3. The combination of claim 1 wherein said first and second openings are of two different diameters and alternate along a substantial length of said strap.

4. The combination of claim 1 wherein said sides are mirror images of each other about the longitudinal axis.

5. The combination of claim 1 wherein said strap has ends containing a plurality of said second openings but not the first openings.

6. The combination of claim 5 wherein said strap has at least one shaped opening therein having a square shape sized to engage a shut-off valve of a bottle of combustible gas.

7. A pipe locator and support for extending between studs in a building to hold plumbing pipes in position, comprising:

an elongated strap having a longitudinal axis and opposing sides, the strap having a first plurality of holes and a second plurality of holes alternating with the first plurality between first and second ends, the second plurality of holes being smaller than the first plurality, the sides undulating to provide a larger width at the first holes and a narrower width at the second holes, wherein the first plurality of holes are equally spaced apart and the second plurality of holes is equally spaced apart with the first and second holes centered on the longitudinal axis, and the ends each having at least one hole sized to allow a shaft of a fastener to extend therethrough during use, while preventing an enlarged head of the fastener from passing therethrough during use of the strap.

8. The pipe locator and support of claim 7, wherein the sides are mirror images of each other about the longitudinal axis.

9. The plumbing strap of claim 7, wherein the first and second plurality of holes have centers on the same longitudinal axis.

10. The plumbing strap of claim 7, wherein the first plurality of holes are about ½ inch in diameter.

11. A pipe locator and support for extending between studs in a building to hold plumbing pipes in position, comprising:
an elongated strap having a longitudinal axis and opposing sides, the strap having a first plurality of holes and a second plurality of holes alternating with the first plurality between first and second ends, the second plurality of holes being smaller than the first plurality, the sides undulating to provide a larger width at the first holes and a narrower width at the second holes, wherein the pipe locator and support comprises a flat strap having a width axis perpendicular to the longitudinal axis and in the plane of the strap, with the undulating sides providing a substantially uniform width between the first and second holes and the adjacent sides at the largest dimension of the holes when measured along the width direction through a center of the holes.

12. The pipe locator and support of claim 11, wherein the first end is adjacent a first hole and the second end is adjacent a second hole.

13. The pipe locator and support of claim 11, wherein the holes are circular and the sides have a first largest width formed by first flats on opposing sides of the first holes and parallel to the longitudinal axis, the sides having a second width smaller than the first width and formed by second flats on opposing sides of the second holes with inclines joining the first and second flats and with the flats being parallel to the longitudinal axis.

14. The pipe locator and support of claim 13, wherein the first and second ends have sides with a third width that is smaller than the first width and larger than the second width.

15. The pipe locator and support of claim 13, wherein the inclines are formed at an angle of about 58° relative to the longitudinal axis.

16. The pipe locator and support of claim 13, wherein the ends contain shaped holes sized to engage a gas-shut-off.

17. The pipe locator and support of claim 13, wherein the holes are circular with a width w between the first holes and the adjacent first flats measured along the width axis through the center of the first holes being about the same as the width w between the second holes and the adjacent second flats measured along the width axis through the center of the second holes.

18. A plumbing strap having a length sufficient to extend between adjacent studs in a building to fasten plumbing pipes between those studs of a building, comprising:
a flat strip of metal having a longitudinal axis and a width axis perpendicular to the longitudinal axis and further having a thickness, the strap having ends with parallel sides and a middle portion with undulating sides undulating between a larger first width and a smaller second width, the strap having a first series of holes extending through the thickness and along the length of the middle portion and located at about the middle of the first widths with a second series of smaller holes extending through the thickness and located at about the middle of the second widths, each end having a plurality of spaced-apart third holes extending through the thickness.

19. The plumbing strap of claim 18, wherein the first holes are spaced the same distance apart and where the second holes are spaced the same distance from each other.

20. The plumbing strap of claim 19, wherein the second width contains a second hole that is spaced apart from the center of the adjacent third hole a distance that is the same as the spacing between the centers of the third holes.

21. The plumbing strap of claim 18, wherein the middle portion has a first hole adjacent the first end and a second hole adjacent the second end.

22. The plumbing strap of claim 18, wherein the middle portion has an undulation having the first width adjacent the first end and an undulation having the second width adjacent the second end.

23. The plumbing strap of claim 18, wherein the ends have a third width that is smaller than the first width and larger than the second width.

24. The plumbing strap of claim 18, wherein the undulations are formed by straight segments some of which are parallel to the longitudinal axis.

25. The plumbing strap of claim 18, wherein one of the third holes is square and sized to engage a gas-shutoff valve.

26. The plumbing strap of claim 18, wherein one of the third holes in each end is square shaped and sized to engage a gas-shutoff valve, with the shaped holes rotated 45° in the plane of the strap relative to each other.

27. The plumbing strap of claim 18, wherein the first holes are circular with a width w between the first holes and the adjacent undulating side measured along the width axis through the center of the first holes, and about the same as the width w between the second holes and the adjacent undulating side measured along the width axis through the center of the second holes.

28. The plumbing strap of claim 18, wherein the ends have a width of about 1 inch.

29. The plumbing strap of claim 18, wherein the first and second series of holes have centers on the same straight line.

30. The plumbing strap of claim 18, wherein the first and second widths extend between flats that are substantially parallel to the longitudinal axis.

31. The plumbing strap of claim 18, wherein the first series of holes is sized to accept a plumbing pipe.

32. The plumbing strap of claim 18, wherein the first series of holes are about ½ inch in diameter.

33. The plumbing strap of claim 18, wherein the first series of holes are about ½ inch in diameter and the second series of holes are about 3/16 inches in diameter.

34. The plumbing strap of claim 18, wherein the first series of holes are about ½ inch in diameter and wherein the first and second widths extend between flats that are substantially parallel to the longitudinal axis.

35. The plumbing strap of claim 18, wherein the first series of holes are about ½ inch in diameter and the second series of holes are about 3/16 inches in diameter and wherein the first and second widths extend between flats that are substantially parallel to the longitudinal axis.

36. The plumbing strap of claim 18, wherein the first series of holes are sized to allow passage of a plumbing pipe and wherein the first and second widths extend between flats that are substantially parallel to the longitudinal axis.

* * * * *